Patented Aug. 3, 1954

2,685,585

UNITED STATES PATENT OFFICE 2,685,585

1-ISONICOTINYL-2-ALKYL-HYDRAZINES

Herman Herbert Fox, Passaic, N. J., assignor to Hoffmann-La Roche Inc., Nutley, N. J., a corporation of New Jersey No Drawing. Application July 6, 1951,
Serial No. 235,567

12 Claims. (Cl. 260—295)

This invention relates to novel derivatives of isonicotinyl hydrazine and more particularly to 1-isonicotinyl-2-R-hydrazines wherein R stands for an alkyl or cycloalkyl radical and the acid addition salts thereof. More specifically, my invention relates to 1-isonicotinyl-2-alkyl-hydrazines where the alkyl group may be a straight chain or a branched chain alkyl, and to 1-isonicotinyl-2-cyclohexyl hydrazine. The compounds comprising my invention can be represented, in the form of their free bases, by the following formula:

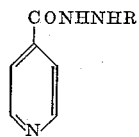

where R has the same meaning already designated hereinabove. The new compounds are of value in the field of therapeutics, and more particularly are useful to combat tuberculosis. In general they can be prepared by reacting the corresponding 1-isonicotinyl-2-alkylidene or cycloalkylidene-hydrazines with one molar equivalent of hydrogen, or by reacting alkyl or cycloalkyl hydrazines with lower alkyl esters of isonicotinic acid.

The 1-isonicotinyl-2-alkylidene hydrazines employed as starting materials may be prepared by reacting isonicotinyl hydrazine with an aliphatic aldehyde which may be a straight chain or branched chain aldehyde, or with an aliphatic ketone. The 1-isonicotinyl-2-cycloalkylidene-hydrazines can be prepared by reacting isonicotinyl hydrazine with a cycloaliphatic ketone, for example, cyclohexanone. 1-isonicotinyl-2-alkylidene-hydrazines and 1-isonicotinyl-2-cycloalkylidene-hydrazines are disclosed and claimed in my copending application, Serial No. 216,256, filed March 17, 1951.

The following examples will serve to illustrate the preparation of the intermediates.

EXAMPLE A

A mixture of 30 grams of isonicotinyl hydrazine, 40 cc. of acetaldehyde and 300 cc. of isopropanol was heated on a steam bath until solution was complete. Upon cooling the mixture, white crystals of practically pure 1-isonicotinyl-2-ethylidene hydrazine precipitated out. The product crystallized from isopropanol or chloroform in the form of white needles, M. P. 175.5–176° C.

EXAMPLE B

A mixture of 40 grams of isonicotinyl hydrazine and 600 cc. of acetone was heated on a steam bath until solution was complete. Upon cooling the reaction mixture, 1-isonicotinyl-2-isopropylidene hydrazine precipitated in the form of white needles; M. P. 161–161.5° C.

EXAMPLE C

Isonicotinyl hydrazine (40 grams), 40 cc. of butyraldehyde and 300 cc. of methanol were mixed. Heat was evolved spontaneously, and a clear solution was obtained. The methanol and excess aldehyde were removed under vacuum. Upon cooling, the residue crystallized. Recrystallization from toluene yielded white granular crystals of 1-isonicotinyl-2-butylidene hydrazine; M. P. 113–114° C.

EXAMPLE D

To a warm solution of 20 grams of isonicotinyl hydrazine in 150 cc. of methanol were added 20 cc. of isobutyraldehyde. The mixture was permitted to stand for 15 minutes. The methanol and excess aldehyde were then removed under vacuum, whereupon 1-isonicotinyl-2-isobutylidene hydrazine was obtained as a solid. Recrystallization from benzene gave the compound in the form of colorless rhomboids; M. P. 136.5–138° C.

EXAMPLE E

Isonicotinyl hydrazine (20 grams), 17 grams of heptaldehyde and 150 cc. of water were mixed whereupon a two-phase oil-water system was formed. On shaking, the oily phase formed a precipitate of 1-isonicotinyl-2-heptylidene hydrazine. On recrystallization from xylene, the compound melted at 101–102° C.

EXAMPLE F

A mixture of 40 grams of isonicotinyl hydrazine, 50 cc. of methyl hexyl ketone and 300 cc. of methanol was refluxed for 4 hours. The methanol was removed under vacuum, and 200 cc. of ligroin (B. P. 60–90° C.) were added to the residue. The mixture was heated on a steam bath, stirred and finally cooled, whereupon white needles of 1-isoicotinyl-2-(1-methylheptylidene)-hydrazine formed. The compound melted at 75–77° C.

EXAMPLE G

Isonicotinyl hydrazine (21 grams) was dissolved in 250 cc. of water, and 15 grams of cyclohexanone were added to the clear solution. The resulting two-phase system was shaken until the cyclohexanone dissolved, upon which 1-isonicotinyl-2-cyclohexylidene hydrazine began to precipitate out in the form of white needles; M. P. 167.5–169.5° C.

EXAMPLE H

Isonicotinyl hydrazine (20 grams), 20 cc. of propionaldehyde and 100 cc. of methanol were mixed. Heat was evolved spontaneously, and a clear solution was obtained. The methanol and excess of the aldehyde were removed under vacuum. Upon cooling, the residue crystallized. Recrystallization from ethyl acetate yielded colorless crystals of 1-isonicotinyl-2-propylidene hydrazine; M. P. 142.5–143.5° C.

EXAMPLE I

A mixture of 20 grams of isonicotinyl hydrazine, 20 cc. of hexaldehyde and 150 cc. of methanol was warmed to solution, and the methanol was then removed under vacuum. A thick syrup was obtained which gave a white precipitate of 1-isonicotinyl-2-hexylidene hydrazine on treatment with ether. On crystallization from xylene, the compound melted at 121.5–123° C.

The following examples will serve to illustrate the preparation of the 1-isonicotinyl-2-R-hydrazines.

EXAMPLE 1

1-isonicotinyl-2-ethyl hydrazine

A solution of 4.89 g. of 1-isonicotinyl-2-ethylidene hydrazine in 150 cc. of methanol was reduced with hydrogen at room temperature and 40 p. s. i. using 300 mg. of platinum black as a catalyst. The reduction was stopped when 1 molar equivalent of hydrogen had been used. The reaction mixture was filtered, the methanol was removed, and the residue was dissolved in isopropanol and then treated with an excess of ethanolic HCl. A precipitate of 1-isonicotinyl-2-ethyl hydrazine dihydrochloride was obtained which was purified by recrystallization from a methanol-acetone mixture to give colorless, feathery crystals which decomposed at 220–222° C.

The free base was prepared by dissolving the dihydrochloride in concentrated ammonium hydroxide, evaporating the solution to dryness, and extracting the residue with chloroform. Upon removal of the chloroform, the free base was obtained in the form of white crystals which melted at 105–107° C.

EXAMPLE 2

1-isonicotinyl-2-isopropyl hydrazine

A solution of 20 g. of 1-isonicotinyl-2-isopropylidene hydrazine in 150 cc. of methanol was reduced with hydrogen at room temperature and 50 p. s. i. using 300 mg. of platinum black as a catalyst. The reduction product was converted to the dihydrochloride according to the procedure described in Example 1. The 1-isonicotinyl-2-isopropyl hydrazine dihydrochloride, upon recrystallization from a methanol-isopropanol mixture, was obtained in the form of white rhomboids which decomposed at 224.5° C.

The free base was prepared in the same way as described in Example 1. It was obtained in the form of white needles which melted at 112° C.

EXAMPLE 3

1-isonicotinyl-2-propyl hydrazine

A solution of 17.7 g. of 1-isonicotinyl-2-propylidene hydrazine in 150 cc. of methanol was hydrogenated as described in Example 1 to give 1-isonicotinyl-2-propyl hydrazine. Upon recrystallization from a mixture of benzene and petroleum ether, the product was obtained in the form of soft, white needles which melted at 60–60.5° C.

EXAMPLE 4

1-isonicotinyl-2-butyl hydrazine

A methanolic solution of 19.1 g. 1-isonicotinyl-2-butylidene hydrazine was hydrogenated as described in Example 1, except that the reduction was carried out at 50–60° C. The 1-isonicotinyl-2-butyl hydrazine thus produced, upon recrystallization from xylene, was obtained in the form of white needles, M. P. 76–77° C.

EXAMPLE 5

1-isonicotinyl-2-isobutyl hydrazine

Fourteen grams of 1-isonicotinyl-2-isobutylidene hydrazine in methanol were reduced as described in Example 4. The reduction product, 1-isonicotinyl-2-isobutyl hydrazine, was converted to the dihydrochloride with ethanolic HCl after removal of the methanol. Upon recrystallization from methanol-isopropanol mixture, the 1-isonicotinyl-2-isobutyl hydrazine dihydrochloride, was obtained in the form of white crystals which melted at 223.5–224.5° C.

EXAMPLE 6

1-isonicotinyl-2-heptyl hydrazine dihydrochloride

Fourteen grams of 1-isonicotinyl-2-heptylidene hydrazine were treated as described in Example 1 to give 1-isonicotinyl-2-heptyl hydrazine dihydrochloride. The compound crystallized in the form of lustrous flakes from methanol-isopropanol mixture, M. P. 222.5–224.5° C.

EXAMPLE 7

1-isonicotinyl-2-(1-methylheptyl) hydrazine

Fifteen grams of 1-isonicotinyl-2-(1-methylheptylidene) hydrazine were hydrogenated as described in Example 1, except that the reduction was carried out at 50–60° C. The product, 1-isonicotinyl - 2 - (1 - methylheptyl) - hydrazine, was converted with ethanolic HCl to the dihydrochloride which was obtained in the form of lustrous, white flakes, decomposing at 221.5–223.5° C.

EXAMPLE 8

1-isonicotinyl-2-methyl hydrazine dihydrochloride

A mixture of 13.7 grams of methyl isonicotinate and 6 grams of methyl hydrazine was heated at 130° C. for 3 hours. The volatile fractions were removed under vacuum, and the viscous residue was dissolved in isopropanol, and filtered to remove any insoluble material. The clear solution on treatment with an excess of ethanolic hydrochloric acid gave a precipitate of 1-isonicotinyl-2-methyl hydrazine dihydrochloride which on purification by recrystallization from a mixture of water-methanol-isopropanol gave colorless needles decomposing at 225.5–226.5° C.

EXAMPLE 9

*1-isonicotinyl-2-hexyl hydrazine dihydrochloride*

A methanolic solution of 20 grams of 1-isonicotinyl-2-hexylidene hydrazine was treated as described in Example 1 to give 1-isonicotinyl-2-hexyl hydrazine dihydrochloride. The compound crystallized from glacial acetic acid in the form of white plates which decomposed at 214–215° C.

EXAMPLE 10

*1-isonicotinyl-2-cyclohexyl hydrazine*

A mixture of 21 grams of isonicotinyl hydrazine and 15 grams (16 cc.) of cyclohexanone in methanol was reduced with hydrogen at room temperature and 50 p. s. i. in the presence of 300 mg. of platinum black as a catalyst. As the reduction proceeded, the solid product tended to precipitate. When 1 molar equivalent of hydrogen had been used, the reduction was stopped and the mixture heated to solution and filtered. The 1-isonicotinyl-2-cyclohexyl hydrazine which precipitated out on cooling the methanolic solution was filtered off, and water was added to the filtrate to give more of the product. The compound crystallized in the form of white needles from ethanol; M. P. 148.5–149° C.

I claim:

1. A compound from the group consisting of those having the following formula, and the acid addition salts thereof,

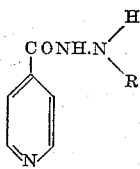

wherein R is a radical selected from the group consisting of lower alkyl and cycloalkyl.

2. Compounds of the following formula

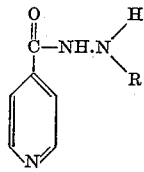

wherein R is lower alkyl.

3. Compounds of the following formula

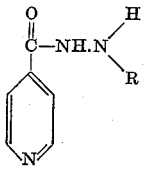

wherein R is cycloalkyl.

4. A compound according to claim 1, in which R represents straight chain lower alkyl.

5. A compound according to claim 1, in which R represents branched chain lower alkyl.

6. A compound according to claim 1, in which R represents a cycloalkyl group.

7. A compound according to claim 1, which is a free base.

8. A compound according to claim 1, which is an acid addition salt.

9. A compound according to claim 1, in which R represents isopropyl.

10. A compound according to claim 9, which is a free base.

11. A compound according to claim 9, which is an acid addition salt.

12. A compound according to claim 9, which is a hydrochloric acid addition salt.

References Cited in the file of this patent

Meyer: Chemical Abstracts, vol. 6 (1912), pp. 2073–4.

Fieser et al.: "Organic Chemistry" (1944), p. 32.